United States Patent Office 2,794,029
Patented May 28, 1957

2,794,029

ALIPHATIC ESTERS AND ETHERS OF 3,4-EPOXY-CYCLOHEXYL-METHANOL

Benjamin Phillips and Paul S. Starcher, Charleston, W. Va., assignors to Union Carbide and Carbon Corporation, a corporation of New York No Drawing. Application August 13, 1953, Serial No. 374,143

14 Claims. (Cl. 260—348)

This invention relates to a new class of organic compounds and has for an object the provision of new types of organic compounds which are particularly suitable for use in the plastics and resins industry. More particularly, this invention is directed to the epoxides of the cyclohexylmethanol series and the corresponding esters and ethers thereof.

The compounds which comprise this invention may be conveniently represented as follows:

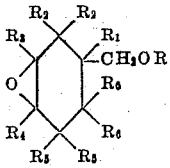

wherein R represents a member selected from the group consisting of hydrogen, acyl, alkyl, alkoxyalkyl, alkenyl and aryl radicals, and $R_1$, $R_2$, $R_3$, $R_4$, $R_5$ and $R_6$ represent members selected from the group consisting of hydrogen and alkyl radicals.

The compounds of this invention are useful as modifying and plasticizing agents for certain types of synthetic condensation resins and are also useful as stabilizers for various synthetic resins.

The compounds of this invention are also useful as intermediates in the preparation of a large number of chemical compounds by virtue of their reactive epoxide group, which can be reacted with a large number of compounds having a labile hydrogen atom. Additionally, the new compounds are useful as intermediates in the preparation of synthetic lubricants, tanning agents and biological preparations.

The compounds of this invention are produced by the oxidation of the olefinic linkage contained in the starting material, such as, for example, $\Delta^3$-cyclohexenyl-methanol and two oxidation methods are provided, both of which are efficacious and provide commercially acceptable yields.

The first oxidation method is called the acetaldehyde monoperacetate method and the reaction whereby the epoxides are formed may be illustrated by the following equation:

ACETALDEHYDE MONOPERACETATE METHOD

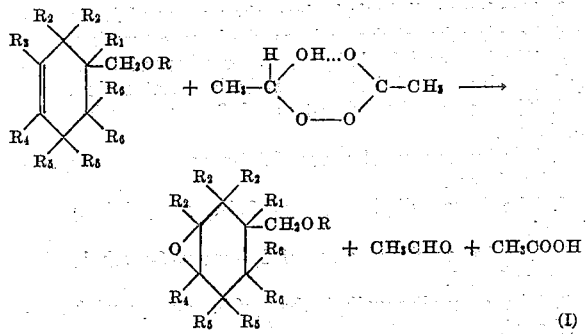

wherein R represents a member selected from the group consisting of hydrogen, acyl, aliphatic, and aryl radicals and $R_1$, $R_2$, $R_3$, $R_4$, $R_5$ and $R_6$ represent members selected from the group consisting of hydrogen and alkyl radicals.

The second oxidation method is called the peracetic acid method and the reaction whereby the epoxides are formed by this method may be illustrated by the following equation:

PERACETIC ACID METHOD

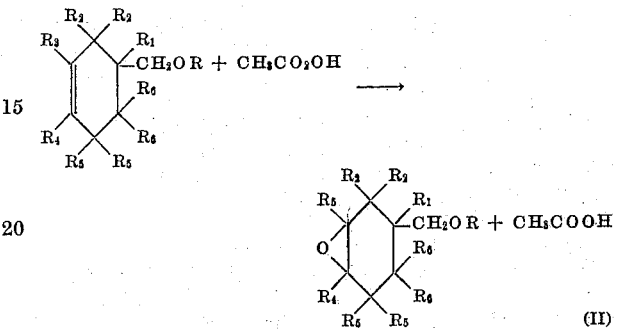

wherein R represents a member selected from the group consisting of hydrogen, acyl, aliphatic and aryl radicals, $R_1$, $R_2$, $R_3$, $R_4$, $R_5$ and $R_6$ represent members selected from the group consisting of hydrogen and alkyl radicals.

The use of peracetic acid as the oxidizing agent is particularly well suited for the epoxidation reaction since the cyclohexenyl ring is relatively easily converted to the corresponding epoxy form. This particular ability of the peracetic acid and other peracids in general to give a satisfactory reaction and acceptable yields of epoxides is not unusual for it has long been recognized that the peracids occupy somewhat a unique position in the field of oxidizing reagents since they are able to effect several types of specific chemical transformations with acceptable efficiencies, while other powerful oxidizing reagents, such as potassium permanganate, are not.

One such type of chemical transformation peculiar to the peracids is that type of reaction which makes available the compounds of this invention, that is, the oxidation of unsaturated organic compounds to produce the corresponding epoxides.

The unsaturated cycloaliphatic alcohols used as starting materials in preparing the epoxy compounds of this invention may be readily obtained by the reaction of butadiene or homologs of butadiene with alpha-beta unsaturated aliphatic aldehydes, such as, for example, acrolein, methacrolein, crotonaldehyde and the like. The unsaturated cycloaliphatic aldehydes are then returned to the corresponding alcohol by known prior art procedures.

Listed below are several of the many combinations of reactants which may be employed in preparing compounds suitable for use as starting materials in making the epoxy compounds of this invention:

Acrolein and butadiene
Crotonaldehyde and butadiene
Methacrolein and butadiene
Acrolein and isoprene
Crotonaldehyde and isoprene
Methacrolein and isoprene
Acrolein and 1,3-pentadiene
Crotonaldehyde and 1,3-pentadiene
Methacrolein and 1,3-pentadiene
Acrolein and 2,3-dimethylbutadiene
Crotonaldehyde and 2,3-dimethylbutadiene
Methacrolein and 2,3-dimethylbutadiene Various other alcohols, such as those reported in U. S. Patents 2,454,047 and 2,557,136; and Jour. Am. Chem.

Soc. 64, 1497–1499 (1942), are suitable for use as starting materials in making the epoxy compounds of this invention.

The acids suitable for use in preparing the esters of the unsaturated cycloaliphatic alcohols prior to the epoxidation reaction may be any suitable aliphatic or aromatic carboxylic acid, such as, for example, acetic acid, chloracetic acid, bromoacetic acid, dichloracetic acid, propionic acid, 1-chlorobutyric acid, butyric acid, 2-ethylbutyric acid, caproic acid, 2-ethylhexoic acid, sorbic acid, succinic acid, pimelic acid, adipic acid and substituted dibasic acids, crotonic acid, maleic acid, acrylic acid, methacrylic acid, chlorbenzoic acid, benzoic acid, toluic acid, cinnammic acid, and the like.

The ethers suitable for use as starting materials in preparing the epoxy compounds of this invention may be derived from aliphatic alcohols such as ethanol, butanol, 2-ethylhexanol, dodecanol, ethylene glycol, glycerol, alkyl alcohol, and the aromatic alcohols, if desired. Alternatively, the ethers derived from alcohols which themselves have ether linkages, such as, 3-oxaalkanols and 3,6-dioxaalkanols, diethylene glycol, triethylene glycol, and the like may be employed successfully.

As may be readily observed, the chemical products of this invention are particularly attractive in view of the fact that they are potentially low in cost. Butadiene and homologs of butadiene and the three alpha, beta-unsaturated aldehydes, acrolein, methacrolein, and crotonaldehyde, are economical starting materials and the steps required to produce the epoxides are conducted with high efficiencies.

This application is a continuation-in-part of application Serial No. 303,152, filed August 7, 1952.

The following examples will serve to illustrate the practice of the invention:

*Example I.*—*Preparation of 3,4-epoxycyclohexylmethyl acetate*

A mixture of 3-cyclohexenylmethyl acetate (390 grams) and ethylbenzene (200 grams) was charged to a still kettle having a column packed with glass helices. The mixture was heated under reduced pressure so that the kettle temperature under reflux was 60° C.–70° C. Over a period of 1.5 hours 380 grams of a 54 percent solution of acetaldehyde monoperacetate was fed gradually into the still. Acetic acid, acetone, and acetaldehyde were removed continuously at the head throughout the run. Distillation of the kettle material gave 216 grams of 3,4-epoxycyclohexylmethyl acetate, a colorless liquid having a boiling point of 119° C.–120° C. at 9 mm. pressure and a refractive index of 1.4598 ($n_D^{30}$). The conversion based on acetaldehyde monoperacetate was 70.5 percent and the efficiency based on the starting olefin was 97 percent.

In analogous manner the propionate, butyrate, and caproate esters of a 3,4-epoxycyclohexylmethanol may be readily prepared.

*Example II.*—*Preparation of the 3,4-epoxycyclohexylmethyl ether of 2-(2-butoxyethoxy)ethanol*

A mixture of the 3-cyclohexenylmethyl ether of 2-(2-butoxyethoxy)ethanol (232 grams) and ethylbenzene (464 grams) was charged to a still kettle having a column packed with glass helices. The mixture was heated under reduced pressure so that the kettle temperature under reflux was 65° C.–75° C. Over a period of 2 hours and 10 minutes 385 grams of a 52 percent solution of acetaldehyde monoperacetate was fed gradually into the still kettle. Acetic acid, acetone, and acetaldehyde were removed continuously at the head throughout the run. Distillation of the kettle material gave 210 grams of a colorless liquid having a boiling range of 143° C.–146° C. at 2.0 mm. pressure and a refractive index range of 1.4557–1.4564 ($n_D^{30}$). This liquid analyzed 85.5 percent of 3,4-epoxycyclohexylmethyl ether of 2-(2-butoxyethoxy)-ethanol. The conversion, based on the starting olefin was 73 percent of the theoretical.

*Example III.*—*Preparation of 3,4-epoxycyclohexylmethyl acrylate*

One hundred and sixty-six grams of 3-cyclohexenylmethyl acrylate were inhibited with 0.5 percent phenyl-β-naphthylamine and cooled to −7° C. Over a 30-minute period 162 grams of a 26.9 percent solution of peracetic acid in acetone were added to the cooled ester with stirring. After standing overnight at −7° C. another like portion of peracetic acid was added. The reaction was allowed to proceed for 16 hours at +3° C. At this time an analysis for peracetic acid indicated that 84 percent of the theoretical amount of the peracetic acid had reacted. The reaction mixture was washed three times with ice water and dried over anhydrous sodium sulfate. Distillation of the dried material in a still having a column packed with glass helices gave a 40 percent yield of 3,4-epoxycyclohexylmethyl acrylate, a colorless liquid boiling at 104° C. at 2.4 mm. pressure and having a refractive index of 1.4770 ($n_D^{30}$). An epoxide analysis of the product indicated a purity of 98.5 percent.

In an analogous manner the methacrylate ester may be prepared.

*Example IV.*—*Preparation of 6-methyl-3,4-epoxycyclohexylmethanol*

Two hundred and nine grams of 6-methyl-3-cyclohexenylmethanol were charged to a flask equipped with stirrer and thermometer. A 25.3 percent solution of peracetic acid in acetone (747 grams) was added dropwise over a period of 3.5 hours with stirring to the alcohol. The reaction was exothermic, and cooling was required to keep the temperature in a 15° C.–30° C. range. Two hours after the addition was completed an analysis for peracetic acid indicated that the reaction was essentially complete. The reaction mixture was fed gradually into a still kettle containing ethylbenzene under reflux at such a pressure to keep the kettle temperature at 70° C. The acetone and acetic acid were removed continuously as a distillate. Distillation of the kettle material gave a 70 percent yield of 6-methyl-3,4-epoxycyclohexylmethanol, a colorless liquid boiling at 82° C. at 0.3 mm. pressure and having a refractive index of 1.4799 ($n_D^{30}$).

What is claimed is:

1. As new compounds, epoxides characterized by the general formula:

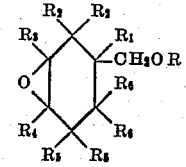

wherein R represents members selected from the group consisting of hydrogen, lower aliphatic hydrocarbon acyl, lower alkyl, lower alkoxyalkyl groups and $R_1$ through $R_6$ represent members selected from the group consisting of hydrogen and lower alkyl groups.

2. The lower aliphatic hydrocarbon esters of 3,4-epoxycyclohexylmethanol free of acetylenic unsaturation.

3. The lower aliphatic hydrocarbon ethers of 3,4-epoxycyclohexylmethanol free of acetylenic unsaturation.

4. The lower alkenyl esters of 3,4-epoxycyclohexylmethanol.

5. The lower alkenyl esters of 3,4-epoxy-6-methylcyclohexylmethanol.

6. The lower alkyl esters of 3,4-epoxycyclohexylmethanol.

7. The lower alkyl esters of 3,4-epoxy-6-methylcyclohexylmethanol.

8. The lower alkoxyalkyl ethers of 3,4-epoxycyclohexylmethanol.

9. The lower alkoxyalkyl ethers of 3,4-epoxy-6-methyl-cyclohexylmethanol.

10. As a new epoxide, 3,4-epoxycyclohexylmethyl acetate.

11. As a new epoxide, 3,4-epoxycyclohexylmethyl acrylate.

12. As a new epoxide, 3,4-epoxycyclohexylmethanol.

13. As a new epoxide, the 2-(2-butoxyethoxy) ethyl ether of 3,4-epoxycyclohexylmethanol.

14. As a new epoxide, 6-methyl-3,4-epoxycyclohexylmethanol.

References Cited in the file of this patent

Paget: J. Chem. Soc., 1938, 829–33.
Beilstein: vol. 17, page 54 (1934).